United States Patent [19]

Bouwhuis et al.

[11] Patent Number: 5,253,038
[45] Date of Patent: Oct. 12, 1993

[54] INTERFEROMETRIC DEVICE FOR DETECTING A CENTERING ERROR

[75] Inventors: Gijsbertus Bouwhuis; Josephus J. M. Braat, both of Eindhoven, Netherlands

[73] Assignee: U.S. Philips Corp., New York, N.Y.

[21] Appl. No.: 607,776

[22] Filed: Oct. 22, 1990

Related U.S. Application Data

[63] Continuation of Ser. No. 21,275, Mar. 3, 1987, abandoned.

[30] Foreign Application Priority Data

Mar. 3, 1986 [NL] Netherlands .................. 8600526

[51] Int. Cl.⁵ ................................. G01B 9/02
[52] U.S. Cl. .................... 356/351; 356/359
[58] Field of Search ........... 356/351, 353, 138, 152, 356/400, 359

[56] References Cited

U.S. PATENT DOCUMENTS

| | | | |
|---|---|---|---|
| 3,528,748 | 9/1970 | Burch et al. | 356/363 |
| 3,832,063 | 8/1974 | Matsumoto et al. | 356/363 |
| 3,877,816 | 4/1975 | Weiss et al. | 356/138 |
| 4,298,283 | 11/1981 | Makosch et al. | 356/351 |
| 4,353,650 | 10/1985 | Sommargren | 356/351 |

OTHER PUBLICATIONS

Philips Technical Review, vol. 30, 1696, pp. 160–166.

Primary Examiner—Samuel A. Turner
Attorney, Agent, or Firm—William L. Botjer

[57] ABSTRACT

A device for detecting a centering error of a rotationally symmetrical surface ($0_1$, $0_2$) of an object (0) with respect to a rotational axis (AR) about which axis the object is rotated for the purpose of the centering error detection is described. Two beams ($b_1$, $b_2$; $b_3$, $b_4$) at angles of approximately 90° are directed onto the object and the variation in the phase difference caused by the centering error ($\epsilon$) between the two beams ($b_1$, $b_2$; $b_3$, $b_4$) reflected by the surface is determined.

13 Claims, 4 Drawing Sheets

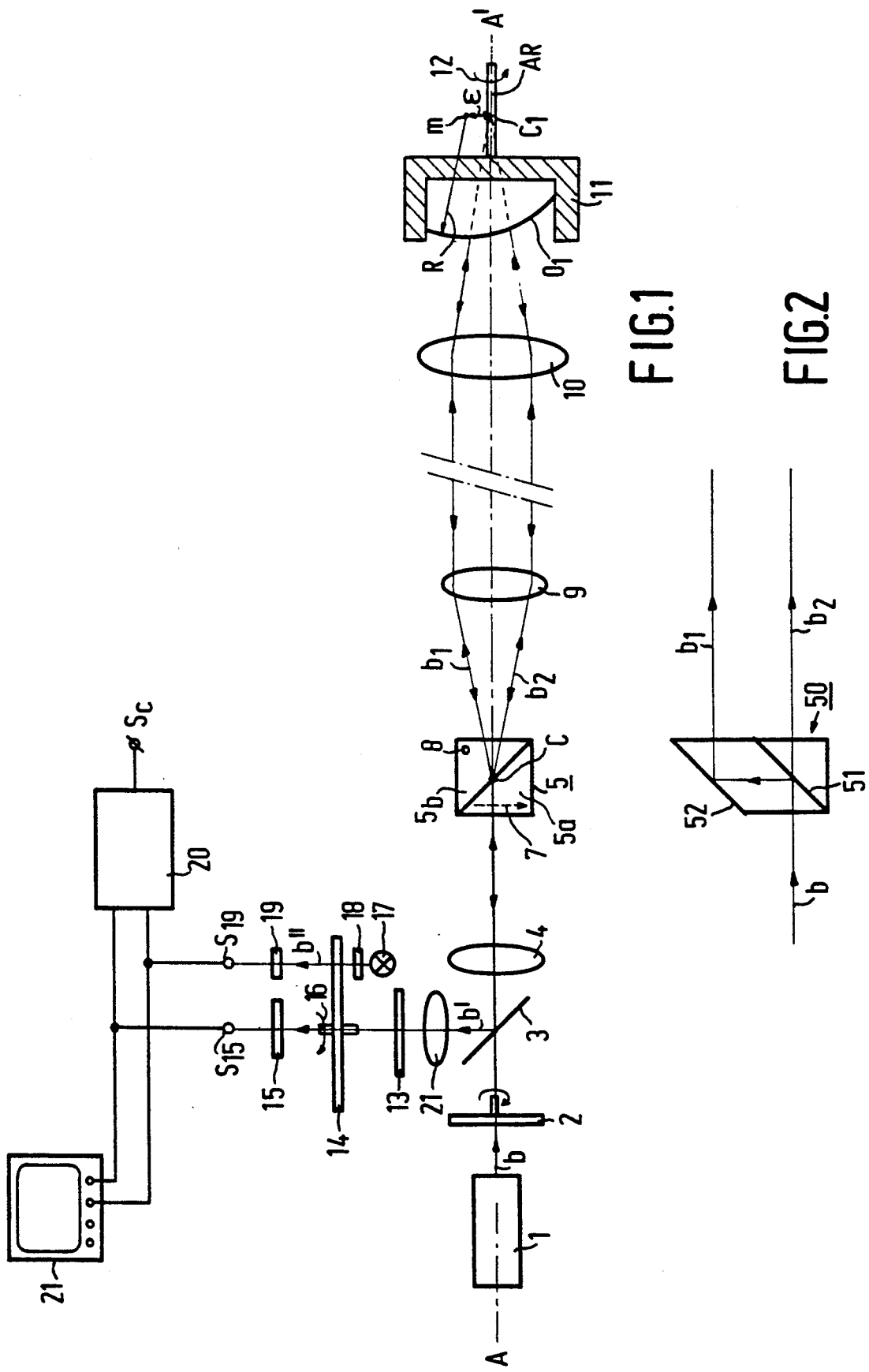

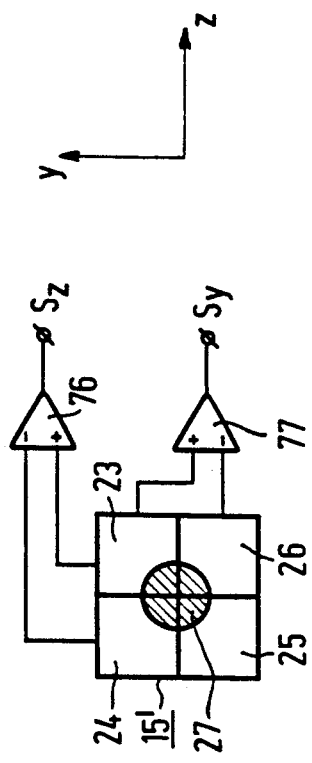
FIG.10
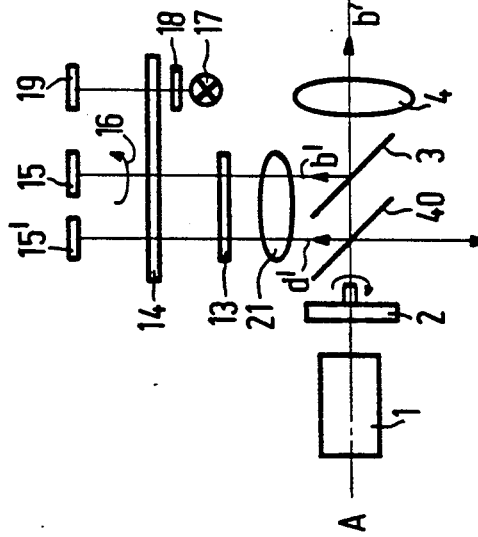
FIG.11
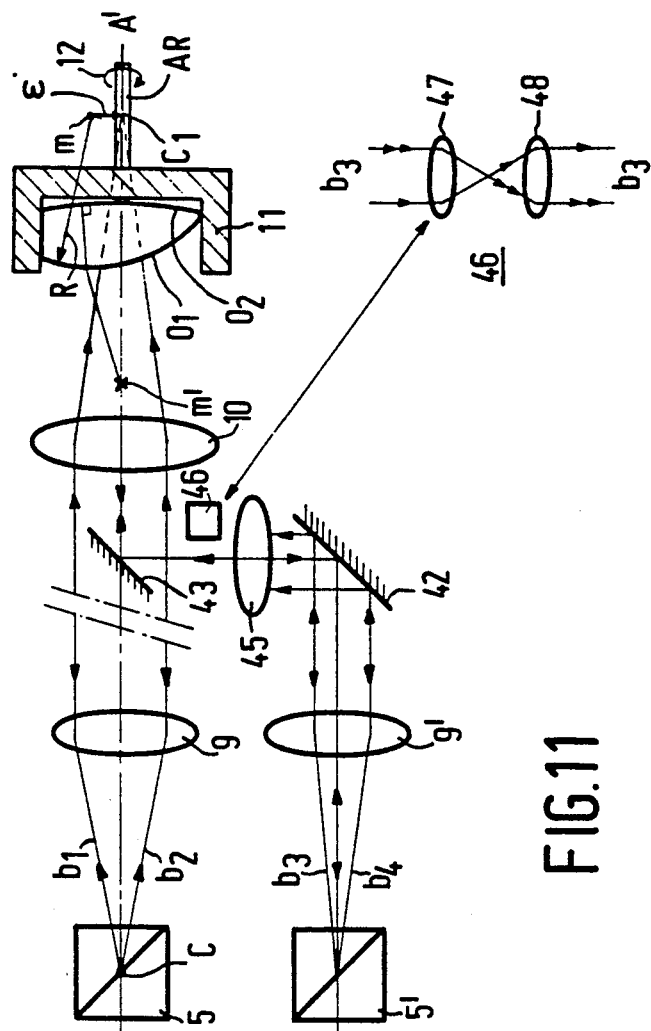

INTERFEROMETRIC DEVICE FOR DETECTING A CENTERING ERROR

This is a continuation of application Ser. No. 021,275, filed Mar. 3, 1987, now abandoned.

BACKGROUND OF THE INVENTION

The invention relates to a device for detecting a centring error of a rotationally symmetrical surface of an object, which device comprisies a radiation source for exposing a small portion of the surface, a rotatable holder for the object and a radiation-sensitive detection system arranged in the path of a beam originating from the surface and supplying a signal which is a measure of the centring error with respect to the rotational axis of the holder.

A device of this type is used, for example, for centring a lens element in its holder before this element is fixed in the holder. Particularly when composing a lens system comprising a large number of lens elements such as a projection lens system, it is important to align each of the lens elements accurately, that is to say, to ensure that the optical axis of each lens element accurately coincides with a reference axis, which is generally the axis of the holder in which all lens elements must be arranged. In the assembly of such a lens system a first lens element is centred with respect to a reference axis and is fixed, subsequently a second lens element is centred with respect to the same reference axis and is fixed, and so forth until all lens elements are fixed in the holder. Each of the refractive surfaces of each lens element must be centred separately. In the case of a spherical surface this means that it must be ascertained whether the centre of curvature of the relevant surface is located on the reference axis. The different rotationally symmetrical sectors of an aspherical rotationally symmetrical surface have different centres of curvature which are located on one line. Centring of such a surface means that coincidence of this line with the reference axis is to be ensured.

In order to detect a centring error the lens element may be rotated around an axis which coincides with the reference axis and a radiation beam can be directed onto the surface to be centred. If the lens surface is not correctly centred with respect to the rotational axis, this surface will make an oscillatory movement. This movement can be detected by a radiation-sensitive detection system arranged in the path of a beam reflected by the surface, which system in principle supplies one output signal, but suitably more and preferably four output signals. By processing these signals in the correct manner the movement of the radiation spot formed on the detection system and hence the movement of the beam and consequently also the centring error of the lens surface can be detected.

A radiation-sensitive detection system of this type may be in the form of, for example, a so-called four-quadrant detector consisting of four separate detectors which are arranged in the four quadrants of an imaginary X-Y system of coordinates. When using such a detector, however, the radiation spot must be pre-aligned with respect to the detector in order that the radiation spot is not imaged on only one or two of the detectors in the case of correct centring of the lens surface.

The radiation-sensitive detection system may also be in the form of a so-called two-dimensional position-sensitive photo diode. Such a photo diode comprises a single semiconductor element having two electrodes or, in the case of a two-dimensional photo diode, four electrodes in which the difference between the output signals at two facing electrodes is a measure of the position of the centre of the intensity profile of a radiation spot formed on this photo diode along the axis connecting the two electrodes. The signals which are supplied by such a position-sensitive photodiode are, however, not only dependent on the position of the radiation spot on this photo diode but also on the intensity variation in the radiation beam.

When used in the device described, both the four-quadrant detector and the position-sensitive photodiode supply signals having a small signal-to-noise ratio due to the low intensity of the radiation spot on these detectors. This low intensity is the result of the low reflection coefficient of the surface to be centred. The said device using a four-quadrant detector of a position-sensitive photodiode is less suitable in practice for high-precision centring of a lens surface. Moreover, the centring error signal in the device described may be affected by irregularities in the lens surface, for example, by errors in the coating of this surface.

SUMMARY OF THE INVENTION

The present invention has for its object to provide a device for detecting centring errors which does not have the said drawbacks, is better usable in practice and is more accurate. The device according to the invention is characterized in that a beam splitter for splitting the radiation beam into two sub-beams and for combining the two sub-beams after they have been reflected by the surface is arranged in the radiation path between the radiation source and the surface to be centred, in that a lens system directing the sub-beam at angles of approximately 90° onto the surface is arranged between the beam splitter and the surface and in that the output signal supplied by the radiation-sensitive detection system is a measure of the variation in phase difference, caused by a centring error, between the two sub-beams.

In this device it is no longer the intensity variation in the detection surface which is determined, which variation is caused by the beam movement, but it is the variation of the phase difference between the two sub-beams which is detected, which phase difference is dependent on the oscillation of the rotating surface. This variation can also be measured with great accuracy for smaller intensities of the sub-beams. Besides, when using phase detection, the resolving power is greater than when using intensity or amplitude detection. Furthermore local reflection differences of the surface to be centred or of the optical elements in the device have substantially no influence on the centring error signal.

A first embodiment of the device is further characterized in that the beam splitter comprises a semitransparent polarisation-sensitive or insensitive mirror in the beam and at least one fully reflecting mirror in the path of at least one of the sub-beams. It must then be ensured that the mirrors are not pivotable.

An alternative could be the use of a diffraction grating as a beam splitter. However, the diffraction grating causes additional radiation loss.

The preferred embodiment of the device according to the invention in which the radiation loss is minimum and which is very stable is further characterized in that the beam-splitting element is a Wollaston prism, in that the beam originating from the source and entering the Wollaston prism is a polarised beam whose azimuth extends at an angle of approximately 45° %to the optic axes of the Wollaston prism, in that a λ/4 plate wherein λ is the wavelength of the radiation beam is arranged in the radiation path between the Wollaston prism and the radiation-sensitive detection system, the optic axis of said plate extending at an angle of 45° to the directions of polarisation of the sub-beams, and in that a polarisation analyser is arranged between the λ/4 plate and the detection system.

The beam b incident on the Wollaston prism may have an arbitrary ellipticity, that is to say, the ellipse described by the E-vector of the electromagnetic radiation may be wide, but it may be alternatively narrow. The azimuth of the polarisation is the longitudinal direction of this ellipse. In the case of a linearly polarised radiation the ellipse has merged into a line in the direction of the azimuth. For the beam b it is only required that the azimuth extends at an angle of approximately 45° to the optic axes of the Wollaston prism.

The Wollaston prism splits the incident radiation beam into two linearly polarised sub-beams having mutually perpendicular directions of polarisation, which beams extend at a small angle to each other. The portions of the sub-beams reflected by the surface to be centred are combined by the Wollaston prism to one beam again having two components which are mutually polarised perpendicularly and have a phase difference which is determined by the centring error of the surface. The λ/4 plate converts the first and the second beam components into left-hand and right-hand, respectively, circularly polarised beam components. As is known, two coincident beams which are left-hand and right-hand circularly polarised respectively constitute one linearly polarised beam whose azimuth of polarisation, also referred to as direction of polarisation in the case of a linearly polarised beam, is determined by the phase difference between the composite beams.

The use of the Wollaston prism and the suitable choice of the direction of polarisation of the beam incident on this prism results in a minimum radiation loss. In addition it has been ensured that the paths of the sub-beams coincide as much as possible; these paths are only different between the Wollaston prism and the surface to be centred. Besides, the Wollaston prism, is not very sensitive to vibrations.

The direction of polarisation of the beam emerging from the λ/4 plate can be detected by means of an analyser arranged stationary between this plate and the detection system and whose optical axis is, for example, perpendicular to the direction of polarisation of the beam emerging from the λ/4 plate if the phase difference between the said sub-beams is zero. If the signal of the detection system, which may be a single photodiode, remains zero upon rotation of the surface to be centred, this surface will then be centred correctly.

However, the device according to the invention is preferably further characterized in that a rotating polarisation analyser is arranged between the λ/4 plate and the radiation-sensitive detection system and in that a position detection system for the analyser is provided.

The signals of the radiation-sensitive detection system and of the position detection system can be visualised by an operator on, for example, an oscilloscope. This operator can readjust the surface in such a manner that the signal of the radiation-sensitive detection system is stable. The surface is then centred correctly.

The device according to the invention may further be characterized in that the electrical outputs of the position detection system and of the radiation-sensitive detection system are connected to the inputs of a phase comparison circuit whose output signal represents the centring error.

The position detection system for the rotating analyser is preferably in the form of an auxiliary radiation source and a polariser which are arranged on one side of the analyser, and a radiation-sensitive detector which is arranged on the other side of the analyser.

The device according to the invention is further characterized in that an active electro-optical or magneto-optical crystal for rotating the direction of polarisation of the beam emerging from the λ/4 plate is arranged between the polarisation analyser and the λ/4 plate.

A phase comparison circuit may be provided for comparing the phase of the output signal of the radiation-sensitive detection system and the phase of the control signal for the active crystal. This makes it possible to automate the centration of the object, for example, a lens. It is then also possible to determine at which rotational angle of the surface with respect to the rotational axis for this surface the phase difference between the sub-beams is maximum. Then not only the magnitude but also the direction of the centring error is known so that it is also known in which direction the centre of curvature must be moved.

Small centring errors can be measured very accurately with the embodiments of the device described. The measuring range of these embodiments is, however, relatively small so that for optimum use a given precentration must have taken place. The coarser centring error detection required for this pre-centration may be realized with the device according to the invention if it is further characterized in that the radiation source supplies a linearly polarised beam whose azimuth is parallel to one of the optic axes of the Wollaston prism, in that an n.λ plate wherein $\frac{1}{4} \leq n \leq \frac{3}{4}$ is arranged between the radiation source and the Wollaston prism, which plate can be switched between two positions so that the azimuth of the beam emerging from this plate is switched between 0° and 45° with respect to the optic axes of the Wollaston prism and in that the radiation-sensitive detection system is adapted to supply four electrical signals from which both a coarse and a fine centring error signal can be derived.

The radiation sensitive detection system may consist of a four-quadrant detector or of a two-dimensional position-sensitive photodiode. For obtaining a coarse centring error signal the n.λ plate is set to the first position, to be referred to as the zero position. Then the radiation beam is not split so that only one beam is incident on the surface to be centred. The four output signals of the radiation sensitive detection system are then processed to a first and a second signal which give an indication about the movement of the radiation spot formed on the detection system in two mutually perpendicular directions. When it is found that the centring error is smaller than a given value, the n.λ plate is set to the second position. Then two beams are incident on the surface to be centred so that the above-described phase measurement can be performed. The four detector signals are then added together.

A device comprising a radiation-sensitive detection system supplying four output signals may be further characterized in that in the radiation path before this detection system a first extra mirror which is pivotable about a first axis is arranged, as well as a second extra mirror which is pivotable about a second axis perpendicular to the first axis, the radiation spot formed on the radiation sensitive detection system having movable with the aid of these mirrors in two mutually perpendicular directions in the plane of the detection system, in that the four detector signals are processed to control signals with which the mirrors are adjusted in such a way that the centre of the radiation spot coincides with the centre of the detection system the positions of the mirrors representing the centring error.

If a four-quadrant detector is used, pre-alignment of the radiation spot on this detector is no longer necessary in this detection method. This detection method may also be used with a two-dimensional position-sensitive photodiode.

The assembly of a multiple lens system may be considerably speeded up if the centration of the second surface of a lens element is no longer performed after the centration of the first surface of this lens element but can take place simultaneous therewith. This is possible with a device according to the invention which is characterized in that it also comprises a second beam splitter for forming a third and a fourth sub-beam, and a lens system arranged between this beam splitter and the object for directing the third and fourth sub-beams at angles of approximately 90° onto the second surface, and a second radiation-sensitive detection system associated with the third and fourth sub-beams for supplying an error signal for the second surface.

This device is preferably further characterized in that a beam inverter element is arranged in the path of one of the third and fourth sub-beams reflected by the second surface. This prevents aberrations caused by the first surface of the object in the third and fourth sub-beams from affecting the centring error signal for the second surface.

BRIEF DESCRIPTION OF THE DRAWING

The invention will now be described in greater detail with reference to the accompanying drawings in which FIG. 1 shows diagrammatically an embodiment of the device according to the invention with which both a fine centring error and a coarse centring error can be detected.

FIG. 2 shows a beam splitter for use in this device,

FIGS. 9 and 10 show alternative methods of detecting a centring error with one radiation beam, and FIG. 11 shows a device according to the invention for simultaneous detection of the centring errors of two surfaces.

DESCRIPTION OF THE PREFERRED EMBODIMENT

Figure 3:
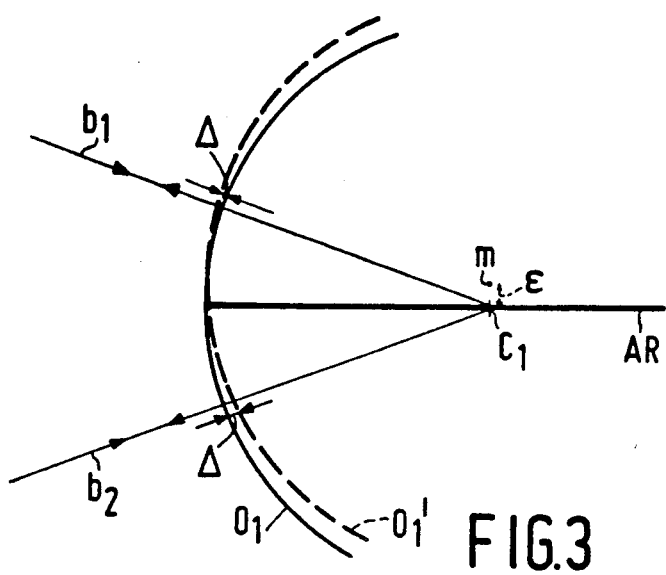
FIG. 3 shows the principle of the invention.

In FIG. 1 the surface which is to be centred, for example, a lens surface or a mirror surface is denoted by $0_1$. This surface has a radius of curvature R and a centre of curvature m. The surface $0_1$ is provided in a holder 11 which is rotatable about an axis AR as is denoted by the arrow 12. The rotational or reference axis AR may coincide with the optical axis AA' of the centring detection device. However, the axes AR and AA' may also extend at angles to each other or they may cross each other.

This device comprises, for example, a coherent radiation source 1, for example a laser, which emits a beam b, a beam splitter 5 which splits the beam b into two sub-beams $b_1$ and $b_2$ and a lens system 9, 10. This lens system, which in principle may consist of a single lens, directs the sub-beams at angles of preferably 90° onto the surface $0_1$. The sub-beams which are directed towards the point $C_1$ in the vicinity of the centre of curvature $m_1$ are partly reflected by the surface $0_1$. The reflected sub-beams traverse substantially the same path as the forward sub-beams and are united to one beam by the beam splitter 5. This beam b' is reflected by a beam divider 3, for example, a semi-transparent mirror or a semi-transparent prism to a radiation-sensitive detection system 15 which in principle may consist of one detector, for example a photodiode.

If the centre of curvature m of the rotationally symmetrical surface $0_1$ is located on the rotational axis, the sub beams $b_1$ and $b_2$ are symmetrically incident on this surface. This situation is shown in FIG. 3 by the solid-line curve $0_1$ for the surface to be centred. Then the sub-beams $b_1$ and $b_2$ traverse the same optical path lengths on their forward and return paths. However, if the centre m of the surface to be centred is moved over a distance $\epsilon$ with respect to the rotational axis and if the surface $0_1'$ assumes the position which is denoted by the broken-line curve in FIG. 3, the length which the beam $b_2$ has traversed on its forward and return paths has increased by an amount of $2\Delta$ at a given moment, and the length of the path of the beam $b_1$ has decreased by an amount of $2\Delta$ so that the path length difference for the beams $b_1$ and $b_2$ is $4\Delta$. Then there is a phase difference between the sub-beams of $\phi = 8\pi\Delta/\lambda$ wherein $\lambda$ is the wave length of the radiation used. This phase difference which is a measure of the centring error of the surface $0_1$ can be measured very accurately, as will be described hereinafter with reference to an embodiment in which mutually perpendicularly polarised sub beams are used.

In this way not only the deviation between the centre of curvature of a sperical surface and the rotational axis but also that between the optical axis of an aspherical surface, which is rotationally symmetrical, and the rotational axis can be determined. In the case of a spherical surface the optical axis is the accumulation of the separate centres of curvature of the rotationally symmetrical sectors of the rotational surface.

Beam splitting may be realized with the aid of a semi-transparent mirror 51 in the path of the beam b which passes half this beam as sub beam $b_2$ and reflects the rest as sub-beam $b_1$ to a completely reflective mirror 52. This mirror ensures that the sub-beam $b_1$ will be parallel to the sub-beam $b_2$. The two mirrors may be arranged in one block 50 of, for example, glass so that the mirrors 51 and 52 are always aligned correctly with respect to each other. However, it must be ensured that the block 50 is not pivotable. If non-coherent radiation is used for the beam b, it must be ensured that the path lengths of the sub-beams $b_1$ and $b_2$ are equal.

It is to be noted that the block 50 with the mirrors 51 and 52 is intended as an alternative to the prism 5 and the lens 9 of FIG. 1.

The beam b can alternatively be split into sub-beams $b_1$ and $b_2$ by means of a diffraction grating. Such a grating may have such a form that the greater part of the radiation are diffracted in the $+1^{st}$ order and in the $-1^{st}$ order, whilst the higher order diffracted sub beams are deflected beyond the entrance pupil of the lens system 9, 10. The zero order sub beam may be suppressed in a simple manner, for example, by means of an absorbing plate.

When using a grating for beam splitting, there is loss of radiation. This is prevented in the preferred embodiment of the device shown in FIG. 1 in which polarising means are used for beam splitting and beam combination. In this Figure element 5 is a Wollaston prism. This prism consists of, for example two sub prisms $5_a$ and $5_b$ of birefringent material whose principal axes or optic axes 7 and 8 are at right angles to each other. It has been ensured that the beam b incident on the prism 5 is an arbitrary polarised beam whose azimuth extends at an angle of approximately 45° to the optic axes 7 and 8. The Wollaston prism splits the beam into two sub-beams having mutually perpendicular directions of polarisation, which beams extend at a small angle to each other. The beams are deflected, for example, symmetrically at small opposite angles with respect to the axis AA'. The reflected sub-beams are united to one beam b' when they pass through the Wollaston prism. This beam has two components with mutually perpendicular directions of polarisation, which components have a mutual phase difference which varies during rotation of the surface $0_1$. The magnitude of this variation is determined by the extent of the centring error of the surface $0_1$.

Instead of two sub-prisms, the Wollaston prism may comprise three sub-prisms in which the optic axes of the two outer sub-prism have the same direction and the optic axis of the inner sub-prism is at right angles to those of the two outer ones. Such a Wollaston prism is symmetrical and diffracts the sub-beams at larger angles than a Wollaston prism comprising two sub-prisms.

Between the beam divider 3 and the detector 15 a $\lambda/4$ plate 13 is arranged in a diagonal position, that is to say, the optic axis of this plate extends at an angle of 45° to the directions of polarisation of the beam components. This plate converts the two linearly polarised beam components into two oppositely circularly polarised beam components which, since they coincide, constitute one linearly polarised beam. The direction of polarisation of this beam is determined by the phase difference between the composite beam components, which phase difference varies in the case of a decentred and rotating surface $0_1$.

The direction of polarisation of the single beam b' can be determined with the aid of a polarisation analyser 14 which is placed in front of the detector 15 and is oriented, for example, in such a way that its transmission direction of polarisation is at right angles to the direction of polarisation of the beam b' when the surface $0_1$ is centred correctly. In the case of correct centring the detector 15 will then receive no radiation and its output signal is zero. As the centring error becomes larger the detector signal will become larger.

This detector signal can be supplied via a control amplifier not shown to a displacement device, likewise not shown, engaging the holder 11 for the surface $0_1$.

Figure 4:
FIG. 4 shows the detector signal obtained in the device of FIG. 1 and the associated reference signal.

The device can be improved by replacing the stationary analyser by a rotating analyser which is denoted by the arrow 16 in FIG. 1. The detector 15 then supplies a periodical sinusoidal signal whose phase is determined by the direction of polarisation of the beam b'. To determine this phase, the device also comprises a position detection system for the analyser. This system comprises an auxiliary radiation source 17, a polariser 18 which passes a linearly polarised beam b" of the radiation emitted by the source 17 and an auxiliary detector 19, preferably a photodiode. The beam b" may be alternatively derived from the main radiation source 1. When the analyser 14 rotates, the detector 19 supplies a periodical sinusoidal signal which is denoted by $S_{19}$ in FIG. 4. This Figure also shows the signal $S_{15}$ of the detector 15. The signals $S_{15}$ and $S_{19}$ can be applied to a phase comparison circuit 20 whose output signal $S_c$ is determined by the phase difference $\Delta f$ between the signals $S_{15}$ and $S_{19}$, hence by the direction of polarisation of the beam b' and consequently by the centring error $\epsilon$.

The signals $S_{15}$ and $S_{19}$ can also be applied to an oscilloscope 21 so that the signal $S_{15}$ can be observed by an operator of the device. The operator can then move the holder 11 of the surface $0_1$ via a manipulator in such a way that the signal $S_{15}$ no longer "runs" when the surface $0_1$ rotates, or in other words, when the phase of $S_{15}$ is constant.

The phase measurement described is very accurate: a rotation of the direction of polarisation through 12° can still be detected correctly. This angle corresponds to a path length difference of $4\Delta = \lambda/30$. For a wavelength $\lambda = 633$ nm a path length difference of $\Delta = 5$ nm can still be detected correctly in principle, which in a specific embodiment of the device may correspond to $\epsilon = 50$ nm. Since the device is dynamic, that is to say, the detector signals are alternating signals, relatively slow variations in the device affecting the intensity of the beams do not have any influence on the centring error signal obtained.

Figures 5, 6:
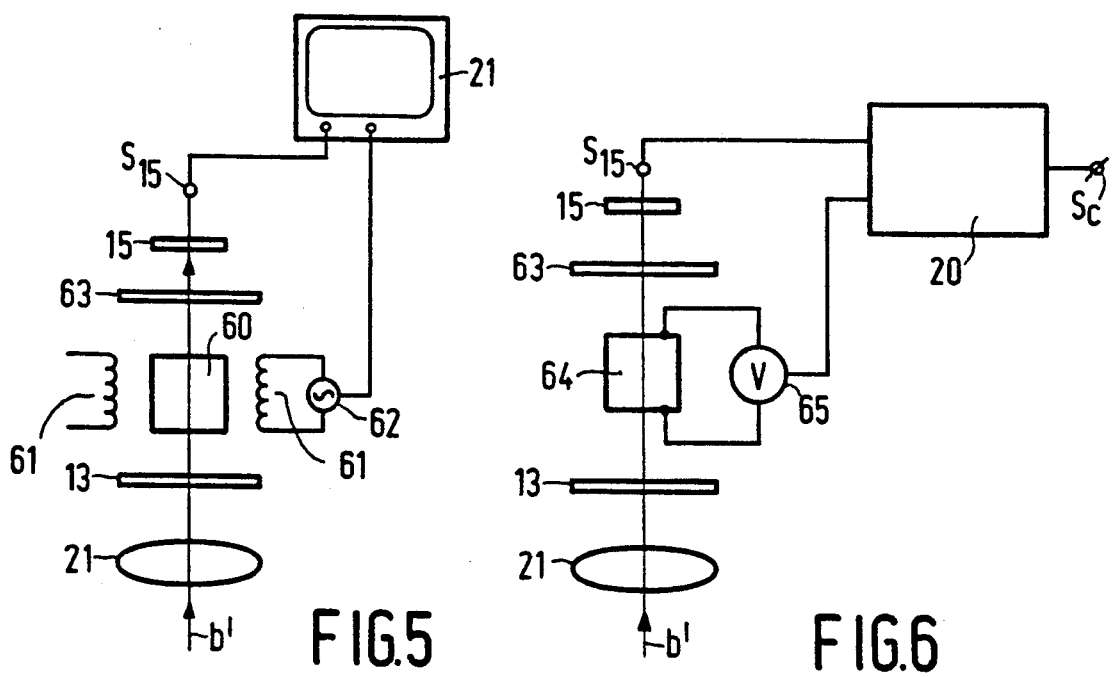
FIGS. 5 and 6 show parts of two embodiments of the device in which a magneto-optical and an electro-optical cell are used, respectively.

The device may also be rendered dynamic by replacing the analyser 14 by a combination of a Faraday rotator 60 and a stationary analyser 63 as is shown in FIG. 5. In a Faraday rotator the direction of polarisation of a linearly polarised beam traversing it is rotated by means of a magnetic field applied around the rotator and generated by a magnetic coil 61 which is energized by a current source 62. A dynamic centring error signal may also be obtained by means of an electro-optical cell 64 such as a Pockels-effect cell, or a Kerr-effect cell on the position of the Faraday rotator as is shown in FIG. 6. Such an electro-optical cell changes the direction of polarisation of a linearly polarised beam traversing it under the influence of an electric field applied across the cell and supplied by a voltage source 65.

When using an electro-optical or a magneto-optical cell, the phase of the output signal $S_{15}$ of the radiation-sensitive detection system can be compared with the phase of the control signal for the cell in a phase comparison circuit 20. It is also possible to apply the two signals to an oscilloscope 21.

The two mutually perpendicularly polarised sub-beams $b_1$ and $b_2$ which extend at a small angle to each other may alternatively be obtained by exposing the Wollaston prism with a beam originating from a so-called Zeeman laser. A laser of this type, which is described in Philips' Technical Review", Vol. 30, 1969, No. 6. 7, pages 160–6, supplies a beam which consists of two oppositely circularly polarised beam components having a frequency difference. With the aid of a $\lambda/4$ plate in front of the Wollaston prism 5 these beam components are converted into two linearly polarised components having mutually perpendicular directions of polarisation and the Wollaston prism gives these components different directions again. The beams reflected and united by the Wollaston prism may traverse the $\lambda/4$ plate 13 and a stationary analyser 14 on their path to the detector 15. A part of the beam supplied by the Zeeman laser may be split off, which part then serves as a reference signal in the phase detection.

As has already been noted, a single lens could be used for directing the sub-beams $b_1$ and $b_2$ at right angles to the surface $0_1$ and to the point $C_1$ on the rotational axis. However, two lenses are preferably used for this purpose, as is shown in FIG. 1. The first lens has such a power and is arranged in such a position that its object focus coincides with the centre C of the prism 5. The power of the second lens 10 is such that its image focus coincides with the point $C_1$. The beams between the two lenses are parallel so that the lens 10 can be moved in dependence upon the axial position of the surface $0_1$.

The device may comprise a further lens 4. This lens ensures that the beam reflected towards the detector 15 has the same width as the beam emitted by the source 1. A lens 21 which focusses the beam b' on the detector may be arranged between the beam splitter 3 and the detector 15.

The radiation source 1 of FIG. 1 may emit a linearly polarised beam and may be rotated in such a way that the direction of polarisation of this beam extends at an angle of 45° to the optic axes of the Wollaston prism 5. However, the linearly polarised beam b emitted by the source 1 preferably has a direction of polarisation which is parallel to one of the optic axes of the Wollaston prism and an adjustable $\lambda/2$ plate is arranged between the source and the beam splitter 3. When this plate is rotated in such a way that its optic axis extends at an angle of 22.5° to the direction of polarisation of the beam b, the beam emerging from the plate 2 has a direction of polarisation which extends at an angle of 45° to the optic axes of the Wollaston prism so that two sub-beams are formed by this prism and a fine centring error signal can be obtained.

If the $\lambda/2$ plate is set to its zero position, that is to say, if its optic axis is parallel to that of the beam b, the beam emerging from this plate has a direction of polarisation which is parallel to one of the optic axes of the Wollaston prism. Only one radiation beam now emerges from this prism and the device can now be used for coarse centring of the surface $0_1$. To this end the polarisation analyser 14 is fixed. The detector 15 must then consist of a composite detector in the form of a four-quadrant detector or a two-dimensional position-sensitive photocell. The movement of the radiation spot formed by the single beam on the detector in two mutually perpendicular directions and hence the centring error of the surface $0_1$ reflecting this beam towards the detector can then be determined with such a composite detector.

Figure 7:
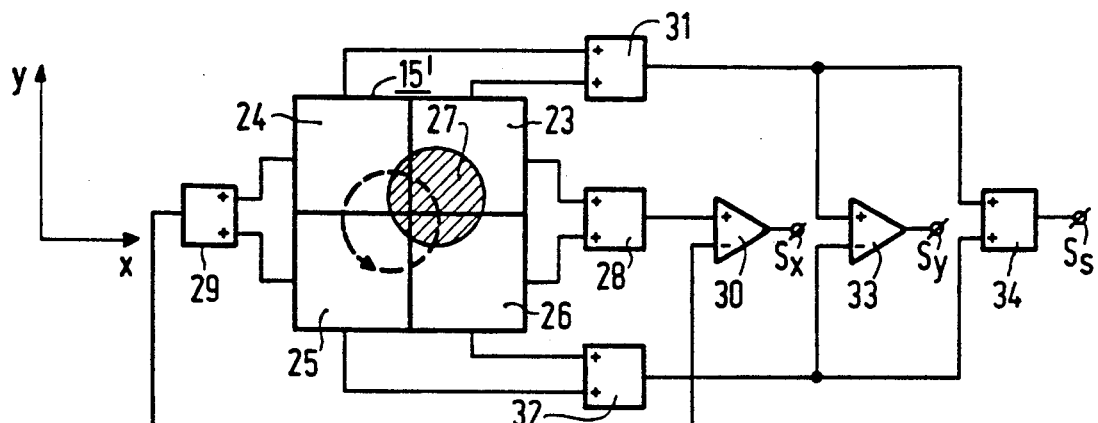
FIGS. 7 and 8 show a first and a second embodiment of a composite detector and the associated signal processing circuit.

In FIG. 7 the reference numeral 15' denotes a four-quadrant detector consisting of four detectors 23, 24, 25 and 26. If the output signals of these detectors are represented by $S_{23}$, $S_{24}$, $S_{25}$ and $S_{26}$, the movement of the radiation spot 27 in the first direction, the X direction, is given by:

$$S_X = (S_{23} + S_{26}) - (S_{24} + S_{25})$$

The movement of the radiation spot 27 in the second direction, the Y-direction is given by:

$$S_Y = (S_{23} + S_{24}) - (S_{25} + S_{26})$$

The signals $S_X$ and $S_Y$ can be obtained in a simple manner with the aid of four summing circuits 28, 29, 31 and 32 and two subtractor circuits 30 and 33. The signals $S_X$ and $S_Y$ may be visualised as X and Y signals on an oscilloscope and the operator can adjust the holder 11 in such a way that the signals remain stable during the rotation of the surface $0_1$.

Subsequently the device can be rendered suitable for fine centring. To this end the $\lambda/2$ plate 2 is set to the position 22.5°, the analyser is rotated and the signals of the detectors are added together with the aid of the summing circuits 31, 32 and 34 so that these detectors effectively constitute one detector.

Figure 8:
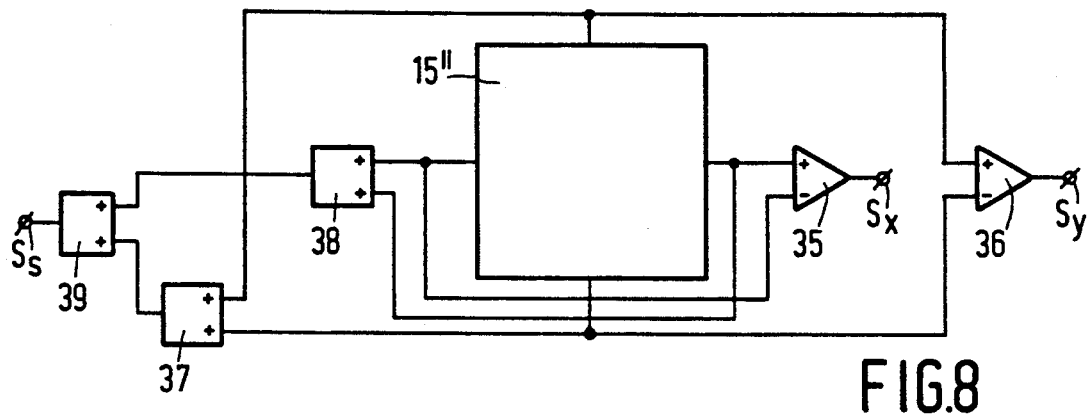

As an alternative to the four-quadrant detector, FIG. 8 shows a two-dimensional position-sensitive photocell and an associated electronic circuit for deriving the signals $S_X$, $S_Y$ and $S_S$. The circuit comprising two subtractor circuits 35 and 36 and three summing circuits 37, 38 and 39 needs no further explanation after the description of FIG. 4.

The $\lambda/2$ plate 2 can be replaced by an arbitrary $n\lambda$ plate in which $\frac{1}{4} \leq n \leq \frac{3}{4}$ whilst the angle through which the plate must be rotated is adapted to n.

Figure 9:
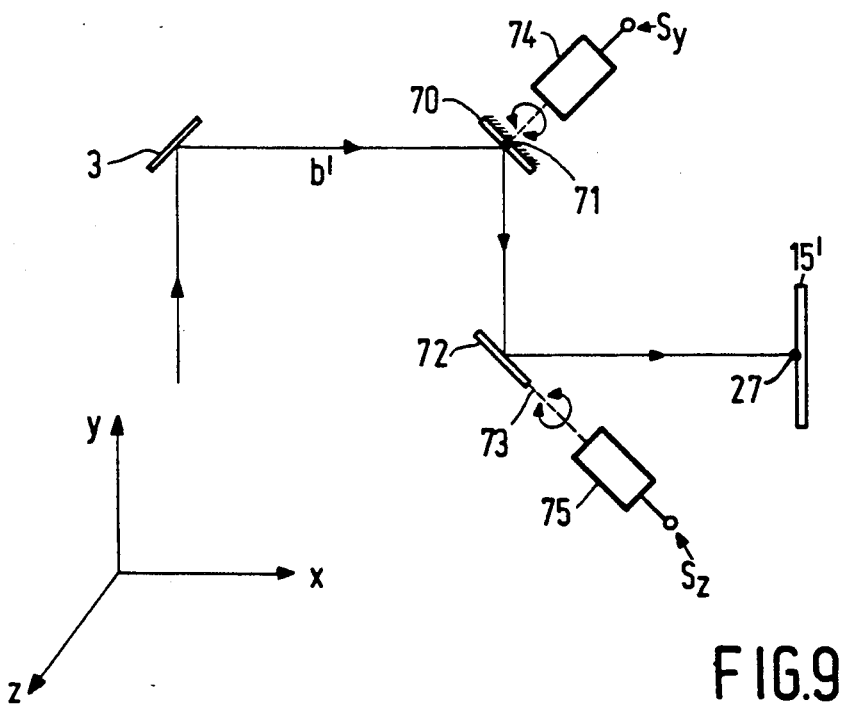

FIG. 9 illustrates a different method of detecting a centring error with the aid of one radiation beam, which method can be combined with the phase measuring method according to the invention. In this Figure reference symbol b' is the beam originating from the surface to be centred, and reflected by the beam splitter 3. On its path to the radiation-sensitive detection system in the form of a four-quadrant detector 15', the beam successively encounters a first extra mirror 70 and a second extra mirror 72. The first mirror is pivotable about an axis 71 in the Z-direction of the XYZ system of coordinates shown in FIG. 9. The plane of the detector 15' is parallel to the YZ-plane. Pivoting of the mirror 70 about the axis 71 causes the radiation spot 27 to move in the Y direction. The second mirror 72 is pivotable about an axis 73 which is in the XY plane. Pivoting this mirror about the axis 73 results in a movement of the radiation spot in the Z direction.

FIG. 10 shows the four-quadrant detector in a front elevational view. The difference signal $S_Z$ of the detectors 23 and 24 obtained with a differential amplifier 76 indicates the position of the radiation spot 27 in the Z direction. The difference signal $S_Y$ of the detectors 23 and 26 obtained with a differential amplifier 77 indicates the position of the radiation spot 27 in the Y direction. The signals $S_Y$ and $S_Z$ may be fed back to the drive means 74 and 75 for the mirrors 70 and 72 so that these mirrors can be pivoted in such a way that the radiation spot 27 is positioned in the centre of the four-quadrant detector. The positions of these mirrors are then determined by the centring error of the surface $0_1$. This centring error can be found by determining the positions of the mirrors 70 and 72 with the aid of known position detecting means or by measuring the value of the control signals for the mirrors if the signals $S_Y$ and $S_Z$ are zero. In this so-called zero method the four-quadrant detector need not be pre-aligned with respect to the beam. The detection method shown in FIGS. 9 and 10 may also be used with a two-dimensional position-sensitive photodiode.

For centring a lens with two refractive surfaces the centring error must be determined for each of these surfaces. When using the device described so far the centring error of a first surface must first be detected and subsequently that of the second surface must be detected. According to the invention the device may be extended in such a manner that the centring errors of the two surfaces can be detected simultaneously.

An embodiment of such a device is shown in FIG. 11. This device comprises a second beam splitter 5', for example again a Wollaston prism. The beam d incident on this beam splitter may originate from the radiation source 1 via a beam divider 40. A reflector 41, for example, a mirror reflects the beam d to the Wollaston prism 5' and the beam emerging from the prism 5' is reflected via further reflectors 42 and 43 in the path of beam b. The lenses 4' and 9' have the same function for this beam as have the lenses 4 and 9 for the beam b. The lens 10 is arranged in the common path of the two beams b and d. The beam reflected by the surface $0_2$ traverses the same path as the beam d and is passed by the beam divider 40 to a second radiation-sensitive detection system 15'.

In order that the sub-beams $b_3$ and $b_4$ formed by the second beam splitter 5' are perpendicularly or substantially perpendicularly incident on the second surface $0_2$ after traversing the first surface $0_1$, for example an extra lens 45 may be arranged in the path of these sub-beams. It is alternatively possible to adapt the lens 10. This lens may be divided, for example into zones which are only traversed by the sub-beams $b_1$ and $b_2$ and into zones which are only traversed by the sub-beams $b_3$ and $b_4$, which different zones have a different power. For the purpose of surveyability FIG. 11 shows only parts of the radiation paths for sub-beams $b_3$ and $b_4$. The sub-beams $b_3$ and $b_4$ may be located beyond the mirror 43 in the same plane as the sub-beams $b_1$ and $b_2$, whilst the distance between the sub-beams $b_3$ and $b_4$ is then, for example shorter than that between the sub-beams $b_1$ and $b_2$. It is also possible for the sub-beams $b_3$ and $b_4$ to be located in a plane which is different from that of the sub-beams $b_1$ and $b_2$; for example one of the sub-beams $b_3$, $b_4$ is located in front of the plane of the drawing and the other is located behind this plane.

The sub-beams $b_3$ and $b_4$ replected by the surface $0_2$ have a phase difference which upon rotation of this surface about the axis AR varies in accordance with the centring error of this surface with respect to the rotational axis AR. This phase difference can be analogously detected as the phase difference between the sub-beams $b_1$ and $b_2$. The elements in the radiation path behind the beam dividers 3 and 40, hence the elements 21, 13 and 14 in FIG. 11 are then preferably used for the two beams b' and d'.

In FIG. 11 the reference symbol m' is the centre of curvature of the surface $0_2$, if this surface is centred correctly. The centre m' is the point of intersection with the rotational axis AR of a ray which is perpendicular to the surface $0_2$ and which is refracted by the first surface $0_1$. The refractive surface $0_1$ introduces aberrations in the sub-beams $b_3$ and $b_4$ reflected by the surface $0_2$, which aberrations are opposed for the two sub-beams. These aberrations may cause interference stripes in the composite beam d' directed towards the detector 15'. To prevent this, a beam inverter element 46 may be arranged in one of the reflected sub-beams $b_3$, $b_4$. Such an element may be, for example a Dove prism, a Pêchan prism or a combination of two lenses 47 and 48, as is shown in the right-hand lower part of FIG. 11. The inverter element 46 ensures that the aberrations caused by the surface $0_{1\ in}$ the reflected sub-beams $b_3$ and $b_4$ are equal so that they cannot cause interference stripes in the composite beam d'.

What is claimed is:

1. A device for detecting a centering error of a rotationally symmetrical surface of an object, which device comprises a radiation source supplying a radiation beam for exposing a portion of the surface, a rotatable holder for the object, a radiation-sensitive detection system for supplying on output signal arranged in the path of a beam reflected from the surface of the object and the output signal being a measure of the centering error with respect to the rotational axis of the holder, a beam splitter for splitting the radiation beam into two measuring sub-beams and for combining the two sub-beams after they have been reflected by the surface arranged between the radiation source and the surface to be centered, and a lens system directing the sub-beams at angles of approximately 90° onto the surface arranged between the beam splitter and the surface, the output signal supplied by the radiation-sensitive detection system showing upon occurrence of a centering error a variation synchronously with the object rotation, which output signal variation represents a variation in phase difference ,caused by a centering error, between the two sub-beams, wherein the improvement comprises that:

the beam splitter is a polarization-sensitive beam splitter which forms two mutually perpendicularly polarized sub-beams, and a λ/4 plate, wherein λ is the wavelength of the radiation beam, is arranged between the beam splitter and the radiation-sensitive detection system, the optical axis of said λ/4 plate extending at an angle of 45° to the directions of polarization of the sub-beams and a polarization analyzer is disposed between the λ/4 plate and the detection system.

2. A device as claimed in claim 1, wherein the beam splitter is a Wollaston prism and in that the radiation source delivers a linearly polarized beam whose azimuth extends at an angle of 45° to the optical axes of the Wollaston prism.

3. A device as claimed in claim 1, characterized in that the beam splitter is a Wollaston prism in that the radiation source is a Zeeman laser and in that a λ/4 plate is arranged between the Zeeman laser and the Wollaston prism.

4. A device as claimed in claim 2, wherein characterized in that the polarization analyzer is stationary.

5. A device as claimed in claim 2, wherein the polarization analyzer is rotatable and in that a position detection system for the analyzer is provided.

6. A device as claimed in claim 5, wherein the electrical outputs of the position detection system and of the radiation-sensitive detection system are connected to the inputs of a phase comparison circuit whose output signal represents the centering error.

7. A device as claimed in claim 5 or 6, wherein the position detection system comprises an auxiliary radiation source and a polarizer which are arranged on one side of the analyzer, and a radiation-sensitive detector which is arranged on the other side of the analyzer.

8. A device as claimed in claim 4, wherein an active electro-optical or magneto-optical crystal for rotating the direction of polarization of the beam emerging from the λ/4 plate is arranged between the polarisation analyser and the λ/4 plate.

9. A device as claimed in claim 8, wherein a phase comparison circuit is provided for comparing the phase of the output signal of the radiation-sensitive detection system and the phase of the control signal for the active crystal.

10. A device as claimed claim 2 or claim 3, wherein the radiation source supplies a linearly polarized beam whose azimuth is parallel to one of the optic axes of the Wollaston prism, in that an n.λ plate wherein $\frac{1}{4} \leq n \leq \frac{3}{4}$ is arranged between the radiation source and the Wollaston prism, which plate can be switched between two positions so that the azimuth of the beam emerging from this plate is switched between 0° and 45° with respect to the optical axes of the Wollaston prism and in that the radiation-sensitive detection system is adapted to supply four electrical signals from which both a coarse and a fine centring error signal can be derived.

11. A device as claimed in claim 1, comprising a radiation-sensitive detection system supplying four output signals, wherein in the radiation path, before this detection system a first extra mirror which is pivotable about a first axis is arranged as well as a second extra mirror which is pivotable about a second axis perpendicular to the first axis, the radiation spot formed on the radiation-sensitive detection system being movable with the aid of said mirrors in two mutually perpendicular directions in the plane of the detection system, in that the four detector signals are processed to control signals with which the mirrors are adjusted in such a way that the center of the radiation spot coincides with the centre of the detection system, the positions of the mirrors representing the centering error.

12. A device as claimed in claim 1 for simultaneously detecting the centering errors of two surfaces of an object, wherein the device also comprises a second beam splitter for forming a third and a fourth sub-beam, and a lens system arranged between this beam splitter and the object for directing the third and fourth sub-beams at angles of approximately 90° onto the second surface, and a second radiation-sensitive detection system associated with the third and fourth sub-beams for supplying a centring error for the second surface.

13. A device as claimed in claim 12, wherein a beam inverter element is arranged in the path of one of the third and fourth sub-beams reflected by the second surface.

* * * * *